US006218533B1

(12) United States Patent
Niimi

(10) Patent No.: US 6,218,533 B1
(45) Date of Patent: Apr. 17, 2001

(54) METHOD FOR MANUFACTURING PIGMENT, ELECTROPHOTOGRAPHIC PHOTOCONDUCTOR USING THE PIGMENT AND ELECTROPHOTOGRAPHIC IMAGE FORMING METHOD AND APPARATUS USING THE PHOTOCONDUCTOR

(75) Inventor: Tatsuya Niimi, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/612,755

(22) Filed: Jul. 7, 2000

Related U.S. Application Data

(62) Division of application No. 09/359,932, filed on Jul. 22, 1999.

(30) Foreign Application Priority Data

Jul. 27, 1998 (JP) ........................................ 10-225177

(51) Int. Cl.$^7$ ........................ C09B 47/08; C09B 47/04

(52) U.S. Cl. ........................ 540/140; 540/122; 540/139; 106/412; 106/413; 430/58.7

(58) Field of Search ........................ 540/139, 122, 540/140; 430/58.7; 106/410, 412

(56) References Cited

U.S. PATENT DOCUMENTS 5,944,887 * 8/1999 Schütze et al. ........................ 106/411

* cited by examiner

*Primary Examiner*—Mukund J. Shah
*Assistant Examiner*—Pavanaram K Sripada
(74) *Attorney, Agent, or Firm*—Cooper & Dunham LLP

(57) ABSTRACT

A method of manufacturing an organic pigment including the steps of providing an organic pigment wet cake which includes at least an organic pigment and a solvent and drying the organic pigment wet cake while the wet cake is heated at a temperature higher than room temperature to prepare a powder of the organic pigment, wherein the organic pigment is present in the organic pigment wet cake in an amount of not greater than about 70% by weight.

8 Claims, 5 Drawing Sheets

METHOD FOR MANUFACTURING PIGMENT, ELECTROPHOTOGRAPHIC PHOTOCONDUCTOR USING THE PIGMENT AND ELECTROPHOTOGRAPHIC IMAGE FORMING METHOD AND APPARATUS USING THE PHOTOCONDUCTOR

CROSS-REFERENCE TO RELATED APPLICATION

This application is a division of applicant's copending U.S. patent application Ser. No. 09/359,932, filed Jul. 22, 1999 (allowed).

BACKGROUND OF THE INVENTION

1. Field of the Invention

The present invention relates to a method for manufacturing organic pigments, an electrophotographic photoconductor using the organic pigments, and an electrophotographic image forming method and apparatus using the electrophotographic photoconductor.

2. Discussion of the Related Art

Organic pigments have been used as a filler for paints because a variety of color paints can be prepared by using them, which is an advantage over inorganic pigments. In recent years, attention is focused on organic pigments because of being able to be used as an organic photoelectric conversion material, and therefore various organic pigments have been developed.

When a layer including such an organic pigment is formed, a wet film-forming method is typically used because a layer of large size can be easily formed. As for the wet film-forming method, a method is typically used in which a coating dispersion including an organic pigment is coated on a substrate and dried to form a coating layer on the substrate. The coating properties of the coating layer formed by a wet film-forming method depend on whether the pigment is uniformly dispersed in a vehicle of the coating dispersion during the coating and drying process.

In order to prepare a good coating dispersion in which a pigment is uniformly dispersed, various dispersing devices and systems have been proposed. In addition, various methods for improving dispersion efficiency have also been proposed. When it is desired to prepare a coating dispersion in which pigment particles having a small particle diameter are uniformly dispersed, a dispersing medium (such as balls used for ball milling methods) of small size is typically used. However, even when a small size dispersing medium is used, a good coating dispersion cannot be necessarily prepared if the pigment used has a property such that it is not easily dispersed in the vehicle used. In order to improve the dispersing property of such a coating dispersion, there are two methods in which a large size dispersing medium is used and a pigment which can be easily dispersed is used. When the former method is used, the particle size of the pigment in the resultant dispersion is relatively large compared to that of the pigment in a coating dispersion dispersed by a small size dispersing medium. Therefore, it is preferable to use the latter method. However, it is difficult to design and synthesize a pigment which can be easily dispersed because it is hard to grasp the relationship between the physical and chemical properties of a pigment and the dispersing property of the pigment in a coating dispersion.

On the other hand, various information processing systems using electrophotography have been developed in recent years. In particular, photo printers in which information, which is converted to digital signals, is recorded in a photosensitive material using light have been dramatically improved in recording qualities and reliability. This digital recording technique is applied not only for printers, but also for copiers, and so-called digital copiers are developed. Since digital copiers have more information processing functions than analogue copiers, it is supposed that the demands for digital copiers will increase more and more from now on.

Laser diodes (LDs) and light emitting diodes (LEDs) are typically used as a light source of photo copiers and printers because of being small in size and having good reliability and low manufacturing cost. As for LEDs, an LED emitting light of 660 nm in wavelength is typically used. As for LDs, an LD emitting near infrared light is typically used. Therefore, a need exists for photoconductor having high photosensitivities over a wavelength range of from the visible region to the near-infrared region.

The photosensitivity of an electrophotographic photoconductor almost depends on the photosensitivity of an electron generating material used in the photoconductor. As for charge generating materials, various kinds of materials such as azo type pigments, polycyclic quinone type pigments, trigonal system selenium, phthalocyanine pigments and the like have been developed. Among these pigments, titanyl phthalocyanine (hereinafter referred to as TiOPc) is very useful for a photoconductor for image forming apparatus such as printers and copiers, in which an LED or LD is used as a light source, because of being sensitive to light having a wavelength of from 600 to 800 nm.

In addition, a photoconductor used for electrophotography such as Carson process and the like is required to have the following charge properties as well as the high sensitivity property to the specific light mentioned above:

(1) a good charging ability in which a high electric potential can be formed and maintained when a photoconductor is charged;

(2) a good charge decaying ability in which when a photoconductor is exposed to light, the electric potential previously formed on the photoconductor rapidly decays and the residual potential is low; and (3) a good charge stability in which a photoconductor can maintain a good charging ability and a good charge decaying ability even when the photoconductor is used for a long time.

In particular, in high sensitive photoconductors such as photoconductors including TiOPc, the charging ability thereof tends to deteriorate and the residual potential tends to increase when the photoconductors are repeatedly used.

Because of these reasons, a need exists for a photoconductor including TiOPc and having a good charge stability.

SUMMARY OF THE INVENTION

Accordingly, an object of the present invention is to provide a method for preparing an organic pigment which is useful for electrophotographic photoconductor and which is effectively dispersed in a vehicle when a coating dispersion including the pigment is prepared.

Another object of the present invention is to provide a photoconductor which has a high sensitivity and which has good durability such that a good charging ability and charge decaying ability can be maintained even when the photoconductor is repeatedly used for a long time.

Yet another object of the present invention is to provide a coating dispersion useful for manufacturing the photoconductor of the present invention.

A further object of the present invention is to provide an electrophotographic image forming method.

A still further object of the present invention is to provide an electrophotographic image forming process cartridge and apparatus using the photoconductor of the present invention.

To achieve such objects, the present invention contemplates the provision of a method of manufacturing an organic pigment including the steps of preparing an organic pigment wet cake which includes at least an organic pigment and a solvent, and drying the organic pigment wet cake by heating the wet cake at a temperature higher than room temperature to prepare a powder of the organic pigment, wherein the organic pigment is present in the organic pigment wet cake in an amount of not greater than about 70% by weight at the beginning of the drying step.

Preferably, the content of the pigment in the wet cake is not greater than about 50% by weight.

In addition, the heating step is preferably performed under a reduced atmospheric pressure not greater than 10 mm Hg.

Further, the organic pigment is a phthalocyanine pigment, and more specifically is a titanyl phthalocyanine compound which has an X-ray diffraction spectrum such that a maximum diffraction peak is observed at an Bragg ($2\theta$) angle of 27.2 ±0.2° when a specific X-ray of Cu-K $\alpha$ (wavelength of 1.514 Å) irradiates the titanyl phthalocyanine compound.

In another aspect of the present invention, a coating dispersion useful for manufacturing an electrophotographic photoconductor is provided in which the organic pigment prepared by the method of the present invention mentioned above is dispersed in a solvent.

In yet another aspect of the present invention, an electrophotographic photoconductor is provided which has a photoconductive layer formed overlying an electroconductive substrate and including the organic pigment prepared by the method of the present invention mentioned above.

In a further aspect of the present invention, an electrophotographic image forming apparatus is provided which includes the photoconductor of the present invention mentioned above.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

Figure 1:
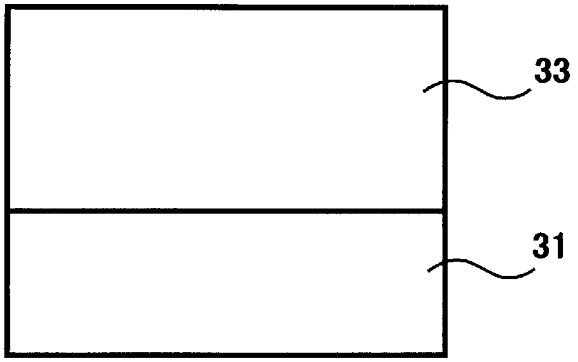
FIG. 1 is a schematic diagram illustrating a sectional view of an embodiment of the electrophotographic photoconductor of the present invention.

The dispersing properties of an organic pigment in a dispersion is broadly classified into a property to be pulverized (pulverizability) and dispersion stability. The dispersion stability of a dispersion including a pigment and a vehicle mainly depends on the factors such as wettability of the pigment with the vehicle, the particle size of the pigment, and the difference between the specific gravities of the pigment and the vehicle. The pulverizability mainly depends on the hardness of a pigment when pulverizing conditions are constant. A hard organic pigment generally has a high bulk density.

Bulk density of organic pigments depends on not only their true specific gravity, but also their cohesive force. Although the minimum unit of organic pigment particles is a primary particle, the primary particle typically aggregates by an interaction between the primary particles such as intermolecular hydrogen bonding, resulting in formation of secondary particles. The particle size of primary particles of a pigment is determined depending on the synthesis conditions of the pigment unless a method such as an acid pasting method in which the pigment is solved is used. On the other hand, the particle size of secondary particles varies depending on the conditions of processes performed after the synthesis process. The greater the particle size of the secondary particles of a pigment, i.e., the more the primary particles of a pigment aggregate, the higher the bulk density of the pigment.

As mentioned above, organic pigments are used as a photoelectric converting material in recent years. In general, an organic pigment having a good photoelectric converting property tends to have a strong cohesive force, and therefore the organic pigment tends to have a high bulk density. Accordingly, it is difficult to uniformly disperse such an organic pigment having a good photoelectric converting property in order to prepare a good coating dispersion. In addition, there is a case that among organic pigments having the same chemical structure, only an organic pigment having a specified crystal form has a good photoelectric converting property. The crystal form of a pigment easily changes by mechanical and physical stresses applied to the pigment during a pulverizing process as well as chemical stresses, and therefore it is not preferable to prepare a coating dispersion while applying too much stresses. Therefore, a need exists for an organic pigment which has a good photoelectric converting property and which can be easily dispersed.

The present invention is to provide a method of manufacturing an organic pigment having a good dispersing property. The method is characterized in that a powder of an organic pigment can be prepared by decreasing aggregation of the primary particles of the pigment while the particle size of the primary particles and the crystal form of the pigment are maintained. The thus prepared organic pigment can be easily dispersed in a vehicle, and thereby a good coating dispersion, which is useful for forming a photoconductive layer, can be prepared.

In the present invention, a method for manufacturing an organic pigment is provided which includes the steps of preparing an organic pigment wet cake which includes at least an organic pigment and a solvent, and drying the organic pigment wet cake by heating the wet cake at a temperature higher than room temperature to prepare a powder of the organic pigment, wherein the organic pigment is present in the organic pigment wet cake in an amount of not greater than about 70% by weight at the beginning of the drying step.

Hereinafter the present invention will be described in detail.

Organic pigments are generally manufactured by a wet process. For example, the wet process is performed as follows:

(1) a pigment is synthesized in a solvent;

(2) the synthesized pigment is washed with a solvent;

(3) the pigment is refined by, for example, recrystallization; and (4) the crystal form of the refined pigment is changed, if desired.

These operations are performed while the pigment is dispersed in a liquid. The thus prepared dispersion including a pigment is filtered or centrifuged to prepare a wet cake of the pigment, and then the wet cake is dried to prepare a powder of the pigment.

If the wet cake has a solid content not less than about 70% by weight when the wet cake is prepared by filtering or centrifuging, a pigment powder having a high bulk density is prepared. As mentioned above, a pigment powder having a high bulk density cannot easily pulverized, i.e., the pulverizing efficiency is low. Therefore, a high mechanical or physical stress is needed to pulverize the pigment, resulting in occurrence of a problem such as change of its crystal form.

When a wet cake having a solid content not greater than about 70% by weight is rapidly dried at a temperature higher than room temperature, a powder having a low bulk density can be formed. This is because the wet cake having a solid content not greater than about 70% by weight includes a considerable amount of a solvent and therefore has a low bulk density itself. To perform the drying operation under a reduced pressure not greater than 10 mm Hg brings better results. The solid content of a pigment in a wet cake is preferably not greater than about 50% by weight. When the solid content is too low, a problem which occurs is that it is not easy to handle the wet cake and it takes a long time to dry the wet cake, resulting in increase of manufacturing cost. Therefore the solid content is preferably from about 20% to about 70%.

Organic pigments for use in the present invention include known organic pigments. Specific examples of such pigments include phthalocyanine type pigments, monoazo pigments, disazo pigments, trisazo pigments, perylene type pigments, perynone type pigments, quinacridone type pigments, quinone type condensation polycyclic compounds, squaric acid type dyes, naphthalocyanine type pigments, azulenium salt type dyes and the like.

Among these pigments, phthalocyanine type pigments are preferable because of having a variety of crystal forms. Of these phthalocyanine pigments, titanyl phthalocyanine has a property such that its carrier generating ability dramatically changes depending on the crystal forms. In particular, titanyl phthalocyanine, which has an X-ray spectrum such that a maximum diffraction peak is observed at a Bragg ($2\theta$) angle of $27.2°\pm0.2°$ when a specific X-ray of Cu-K $\alpha$ having a wavelength of 1.514 Å irradiates the pigment, has a very high photo-carrier generating ability. However, the pigment is unstable and therefore easily changes to another crystal form. According to the present invention, a dispersion in which titanyl phthalocyanine having a desired crystal form is dispersed can be stably prepared.

As for the dryers for drying wet cakes of pigments by heating to a temperature higher than room temperature, known dryers can be used. When the drying operation is performed in the atmosphere, an air blowing type dryer is preferable. In addition, it is preferable to perform the drying operation under a reduced atmospheric pressure if a pigment to be dried easily decomposes or changes its crystal form at a high temperature. The pressure of the reduced atmospheric pressure is preferably not greater than 10 mm Hg (i.e., a higher vacuum state than a state in which the atmospheric pressure is 10 mm Hg).

Next, coating dispersions of the present invention useful for preparing electrophotographic photoconductors will be explained. When a coating dispersion including a pigment useful for an electrophotographic photoconductor are prepared, the pigment has to be dispersed while maintaining its crystal form if desired functions of the photoconductor can be obtained only by the pigment having the crystal form. In recent years, resolution of reproduced images is regarded as the most important property in electrophotography, and therefore the particle diameter of a pigment included in a photoconductor becomes smaller and smaller. When a dispersion including a small size pigment is prepared, it is important to use a pigment which has a small particle diameter and which is easily dispersed in a vehicle used. By using the pigment having a low bulk density prepared by the method of the present invention, such a desired dispersion can be prepared.

The coating dispersion of the present invention can be prepared by any known method. For example, a pigment is dispersed in a proper solvent, if desired, together with a binder resin using a dispersing device such as ball mills, attritors, sand mills and super sonic dispersing machines. As for the binder resin, one or more binder resins are selected from known resins such that the resultant photoconductor has desired charge properties. In addition, the solvent is also selected from known solvents such that the pigment used is easily wet with the solvent and is stably dispersed therein. The solvent may be different from or the same as the solvent included in the wet cake.

Hereinafter, the electrophotographic photoconductor of the present invention will be explained referring to figures.

FIG. 1 is a schematic view illustrating a cross section of an embodiment of the electrophotographic photoconductor of the present invention. In FIG. 1, a single-layer type photoconductive layer 33 which is mainly constituted of a charge generating material and a charge transporting material is formed on an electroconductive substrate 31.

Figure 2:
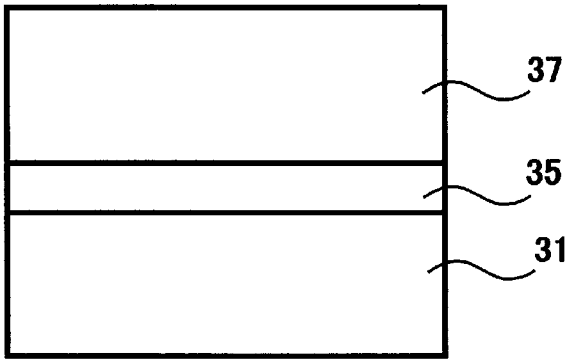
FIG. 2 is a schematic diagram illustrating a sectional view of another embodiment of the electrophotographic photoconductor of the present invention.
Figure 3:
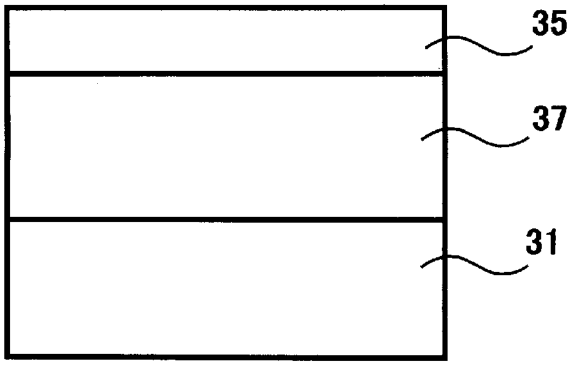
FIG. 3 is a schematic diagram illustrating a sectional view of yet another embodiment of the electrophotographic photoconductor of the present invention.

FIGS. 2 and 3 are schematic views illustrating cross sections of other embodiments of the electrophotographic photoconductor of the present invention. The photoconductors as shown in FIGS. 2 and 3 have multi-layer structures in which a charge generating layer 35 which is mainly constituted of a charge generating material and a charge transporting layer 37 which is mainly constituted of a charge transporting material are overlaid.

Suitable materials for use as the electroconductive substrate include materials having a volume resistance not greater than $10^{10}\Omega$ cm. Specific examples of such materials include plastic cylinders, plastic films or paper sheets, on the surface of which a metal such as aluminum, nickel, chromium, nichrome, copper, gold, silver, platinum and the like, or a metal oxide such as tin oxides, indium oxides and the like, is deposited or sputtered. In addition, a tube can also be used as the substrate 31 which is prepared by tubing a plate of a metal such as aluminum, aluminum alloys, nickel, stainless steel and the like or tubing by a method such as impact ironing or direct ironing, and then treating the surface of the tube by cutting, super finishing, polishing and the like. Further, endless belts of a metal such as nickel, stainless steel and the like, which have been disclosed, for example, in Japanese Laid-Open Patent Publication No. 52-36016, can also be used as the substrate 31.

Furthermore, substrates, in which a coating liquid including a binder resin and an electroconductive powder is coated on the supporters mentioned above, can be used as the substrate 31. Specific examples of the electroconductive powder include carbon black, acetylene black, powders of metals such as aluminum, nickel, iron, nichrome, copper, zinc, silver and the like, and metal oxides such as electroconductive tin oxides, ITO and the like. Specific examples of the binder resin include known thermoplastic resins, thermosetting resins and photo-crosslinking resins, such as polystyrene, styrene-acrylonitrile copolymers, styrene-butadiene copolymers, styrene-maleic anhydride copolymers, polyesters, polyvinyl chloride, vinyl chloride-vinyl acetate copolymers, polyvinyl acetate, polyvinylidene chloride, polyarylates, phenoxy resins, polycarbonates, cellulose acetate resins, ethyl cellulose resins, polyvinyl butyral resins, polyvinyl formal resins, polyvinyl toluene, poly-N-vinyl carbazole, acrylic resins, silicone resins, epoxy resins, melamine resins, urethane resins, phenolic resins, alkyd resins and the like. The electroconductive layer can be formed by coating a coating liquid in which an electroconductive powder and a binder resin are dispersed or dissolved in a proper solvent such as tetrahydrofuran, dichloromethane, methyl ethyl ketone, toluene and the like, and then drying the coated liquid.

In addition, substrates, in which an electroconductive resin film is formed on a surface of a cylindrical substrate using a heat-shrinkable resin tube which is made of a combination of a resin such as polyvinyl chloride, polypropylene, polyesters, polyvinylidene chloride, polyethylene, chlorinated rubber and fluorine-containing resins, with an electroconductive material, are also used as the substrate 31.

Next, the photoconductive layer of the photoconductor of the present invention will be explained.

In the present invention, the photoconductive layer may be a single-layer type photoconductor or a multi-layer type photoconductor.

At first, multi-layer type photoconductors in which the charge generating layer 35 and the charge transporting layer 37 are overlaid will be explained.

In the charge generating layer 35, an organic pigment which is prepared by the aforementioned method of the present invention is mainly included as the charge generating material. The organic pigment is dispersed in a proper solvent, if desired together with a binder resin, using a dispersing device such as ball mills, attritors, sand mills and super sonic dispersing machines to prepare a coating liquid. The thus prepared coating liquid is coated on a substrate 31 and dried, resulting in formation of the charge generating layer 35.

Suitable binder resins, which are optionally mixed in the charge generating layer coating liquid, include polyamides, polyurethanes, epoxy resins, polyketones, polycarbonates, silicone resins, acrylic resins, polyvinyl butyral, polyvinyl formal, polyvinyl ketones, polystyrene, polysulfone, poly-N-vinylcarbazole, polyacrylamide, polyvinyl benzal, polyesters, phenoxy resins, vinyl chloride-vinyl acetate copolymers, polyvinyl acetate, polyphenylene oxide, polyamides, polyvinyl pyridine, cellulose resins, casein, polyvinyl alcohol, polyvinyl pyrrolidone, and the like. The content of the binder resin in the charge generating layer 35 is preferably from 0 to 500 parts by weight, and more preferably from 0 to 300 parts by weight, per 100 parts by weight of a charge generating material.

Suitable solvents for use in the charge generating layer coating liquid include isopropanol, acetone, methyl ethyl ketone, cyclohexanone, tetrahydrofuran, dioxane, ethyl cellosolve, ethyl acetate, methyl acetate, dichloromethane, monochlorobenzene, cyclohexane, toluene, xylene, ligroin, and the like.

The coating liquid can be coated by a coating method such as dip coating, spray coating, bead coating, nozzle coating, spinner coating and ring coating. The thickness of the charge generating layer 35 is preferably from 0.01 to 5 $\mu$m, and more preferably from 0.1 to 2 $\mu$m.

The charge transporting layer 37 can be formed by coating a charge transporting layer coating liquid, which is prepared by dispersing or dissolving a charge transporting material and a binder resin in a proper solvent, on the charge generating layer 35, and then drying the coated liquid. In addition, additives such as a plasticizer, a leveling agent, an antioxidant and the like can be added in the coating liquid, if desired.

Charge transporting materials are classified into positive-hole transporting materials and electron transporting materials.

Specific examples of the electron transporting materials include electron accepting materials such as chloranil, bromanil, tetracyanoethylene, tetracyanoquinodimethane, 2,4,7-trinitro-9-fluorenon, 2,4,5,7-tetranitro-9-fluorenon, 2,4,5,7-tetanitroxanthone, 2,4,8-trinitrothioxanthone, 2,6,8-trinitro-4H-indeno[1,2-b]thiophene-4-one, 1,3,7-trinitrodibenzothiphene-5,5-dioxide, benzoquinone derivatives and the like.

Specific examples of the positive-hole transporting materials include known materials such as poly-N-carbazole and its derivatives, poly-y-carbazolylethylglutamate and its derivatives, pyrene-formaldehyde condensation products and their derivatives, polyvinyl pyrene, polyvinyl phenanthrene, polysilane, oxazole derivatives, oxadiazole derivatives, imidazole derivatives, monoarylamines, diarylamines, triarylamines, stilbene derivatives, α-phenyl stilbene derivatives, benzidine derivatives, diarylmethane derivatives, triarylmethane derivatives, 9-styrylanthracene derivatives, pyrazoline derivatives, divinyl benzene derivatives, hydrazone derivatives, indene derivatives, butadiene derivatives, pyrene derivatives, bisstilbene derivatives, enamine derivatives, and the like.

These charge transporting materials are used alone or in combination.

Suitable binder resins for use in the charge transporting layer coating liquid include thermoplastic or thermosetting resins such as polystyrene, styrene-acrylonitrile copolymers, styrene-butadiene copolymers, styrene-maleic anhydride copolymers, polyesters, polyvinyl chloride, vinyl chloride-vinyl acetate copolymers, polyvinyl acetate, polyvinylidene chloride, polyarylates, phenoxy resins, polycarbonates, cellulose acetate resins, ethyl cellulose resins, polyvinyl butyral resins, polyvinyl formal resins, polyvinyl toluene, poly-N-vinyl carbazole, acrylic resins, silicone resins, epoxy resins, melamine resins, urethane resins, phenolic resins, alkyd resins and the like.

The content of the charge transporting material in the charge transporting layer 37 is preferably from 20 to 300 parts by weight, and more preferably from 40 to 150 parts by weight, per 100 parts by weight of the binder resin. The thickness of the charge transporting layer 37 is preferably form about 5 to 100 $\mu$m.

Suitable solvent for use in the charge transporting layer coating liquid include tetrahydrofuran, dioxane, toluene, dichloromethane, monochlorobenzene, dichloroethane, cyclohexanone, methyl ethyl ketone, acetone and the like.

In the charge transporting layer 37, a high molecular weight charge transporting material, which serves as a charge transporting material and a binder resin, can be preferably used. When the charge transporting layer 37 is constituted of a high molecular weight charge transporting material, the charge transporting layer 37 has good abrasion resistance. Suitable high molecular weight charge transporting materials for use in the charge transporting layer 37 include known high molecular weight charge transporting materials. Among these materials, polycarbonates having a triarylamine structure in the main chain and/or the side chain thereof are preferably used. In particular, the materials represented by the following formulas (1) to (10) are more preferably used.

(1)

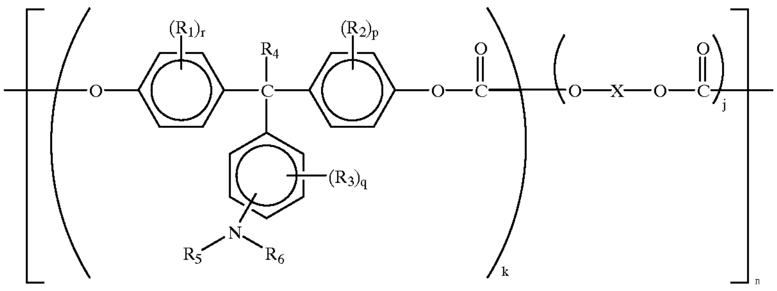

wherein R1, R2 and R3 independently represent an alkyl group which is substituted or is not substituted, or a halogen atom; R4 represents a hydrogen atom, or an alkyl group which is substituted or is not substituted; R5, and R6 independently represent an aryl group which is substituted or is not substituted; r, p and q independently represent 0 or an integer of from 1 to 4; k is a number of from 0.1 to 1.0 and j is a number of from 0 to 0.9; and n is an integer of from 5 to 5000; and X represents a divalent aliphatic group, a divalent alicyclic group or a divalent group having the following formula:

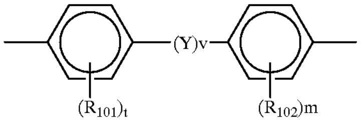

wherein R101 and R102 independently represent an alkyl group which is substituted or is not substituted, an aryl group which is substituted or is not substituted, or a halogen atom; t and m represent 0 or an integer of from 1 to 4; v is 0 or 1; and Y represents a linear alkylene group, a branched alkylene group, a cyclic alkylene group, —O—, —S—, —SO—, —$SO_2$—, —CO—, —CO—O—Z—O—CO— (Z represents a divalent aliphatic group), or a group having the following formula:

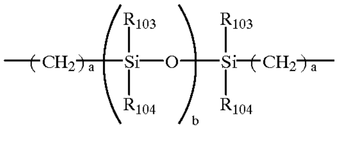

wherein a is an integer of from 1 to 20; b is an integer of from 1 to 2000; and R103 and R104 independently represent an alkyl group which is substituted or is not substituted, or an aryl group which is substituted or is not substituted, wherein R101, R102, R103 and R104 may be the same or different from each other.

(2)

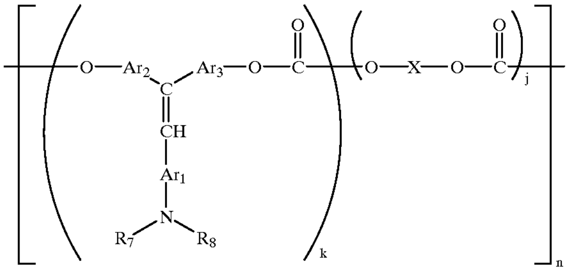

wherein R7 and R8 independently represent an aryl group which is substituted or is not substituted; Ar1, Ar2 and Ar3 independently represent an arylene group; and X, k, j and n are defined above in formula (1).

(3)

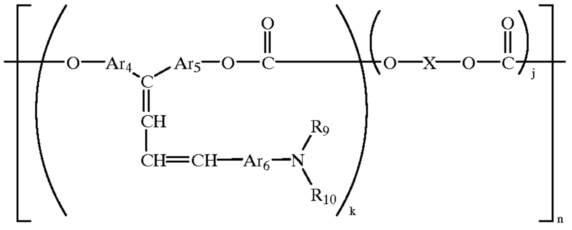

wherein R9 and R10 independently represent an aryl group which is substituted or is not substituted; Ar4, Ar5 and Ar6 independently represent an arylene group; and X, k, j and n are defined above in formula (1).

(4)

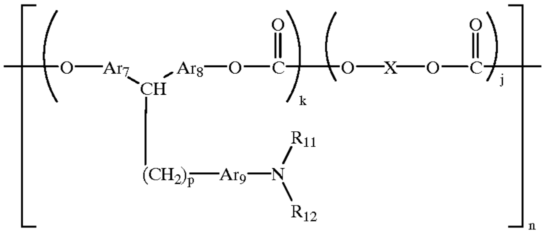

wherein R11 and R12 independently represent an aryl group which is substituted or is not substituted; Ar7, Ar8 and Ar9 independently represent an arylene group; p is an integer of from 1 to 5; and X, k, j and n are defined above in formula (1)

(5)

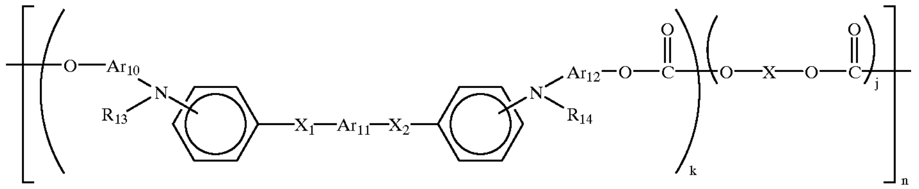

wherein R13 and R14 independently represent an aryl group which is substituted or is not substituted; Ar10, Ar11 and Ar12 independently represent an arylene group; X1 and X2 independently represent an ethylene group which is substituted or is not substituted, or a vinylene group which is substituted or is not substituted; and X, k, j and n are defined above in formula (1).

(6)

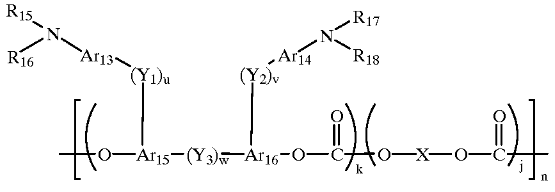

wherein R15, R16, R17 and R18 independently represent an aryl group which is substituted or is not substituted; Ar13, Ar14, Ar15 and Ar16 independently represent an arylene group; Y1, Y2 and Y3 independently represent an alkylene group which is substituted or is not substituted, a cycloalkylene group which is substituted or is not substituted, an alkyleneether group which is substituted or is not substituted, an oxygen atom, a sulfur atom, or a vinylene group; u, v and w independently represent 0 or 1; and X, k, j and n are defined above in formula (1).

(7)

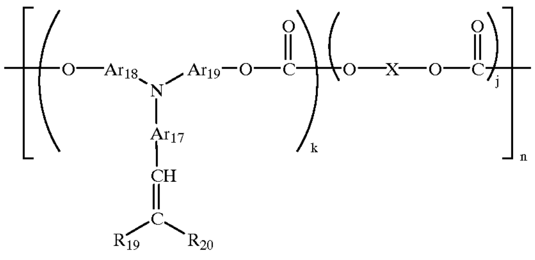

wherein R19 and R20 independently represent a hydrogen atom, or aryl group which is substituted or is not substituted, and R19 and R20 may form a ring; Ar 17, Ar18 and Ar19 independently represent an arylene group; and X, k, j and n are defined above in formula (1).

(8)

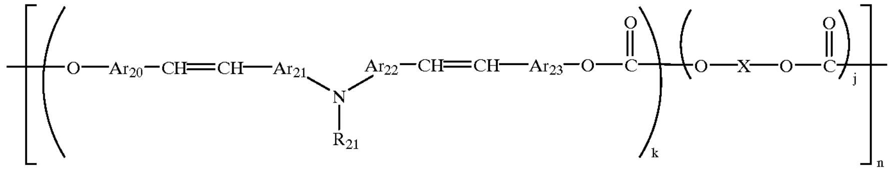

wherein R21 represents an aryl group which is substituted or is not substituted; Ar 20, Ar21, Ar22 and Ar23 independently represent an arylene group; and X, k, j and n are defined above in formula (1).

(9)

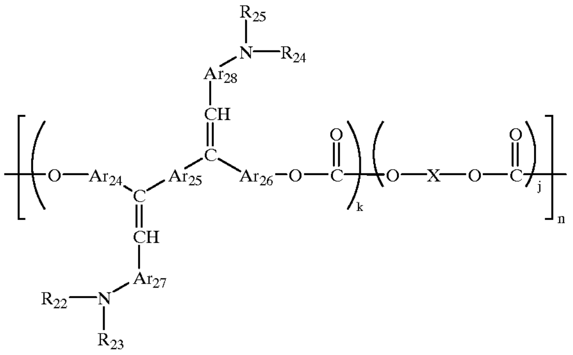

wherein R22, R23, R24 and R25 independently represent an aryl group which is substituted or is not substituted; Ar24, Ar25, Ar26, Ar27 and Ar28 independently represent an arylene group; and X, k, j and n are defined above in formula (1).

(10)

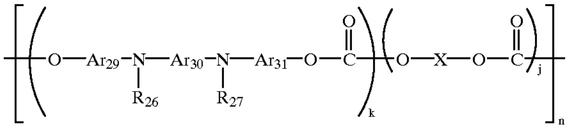

wherein R26 and R27 independently represent an aryl group which is substituted or is not substituted; Ar29, Ar30 and Ar31 independently represent an arylene group; and X, k, j and n are defined above in formula (1).

The charge transporting layer 37 may include an additive such as plasticizers and leveling agents. Specific examples of the plasticizers include dibutyl phthalate, dioctyl phthalate and the like, which are used as the plasticizer for resins. The content of the plasticizer in the charge transporting layer 37 is preferably form 0 to about 30 parts by weight per 100 parts by weight of the binder resin. Specific examples of the leveling agent include silicone oils such as dimethylsilicone oil, and methylphenylsilicone oil, and polymers or oligomers which have a perfluoroalkyl group in their side chain. The content of the leveling agent in the charge transporting layer 37 is preferably form 0 to about 1 part by weight per 100 parts by weight of the binder resin.

Next, a single-layer type photoconductor will be explained. In the single-layer type photoconductor, the organic pigment prepared by the aforementioned method of the present invention can also be used. The photoconductive layer 33 can be formed on the substrate 31 by coating a coating liquid, which is prepared by dispersing or dissolving a charge generating material and a binder resin in a proper solvent, and then drying the coated liquid. In the photoconductive layer 33, one or more of the charge transporting materials (1) to (10) mentioned above cab be added to prepare a functionally separated photoconductor. In addition, an additive such as plasticizers, leveling agents and antioxidants may be included.

As for the binder resin for use in the photoconductive layer 33, the resins mentioned above for use in the charge transporting layer 37 can be used. In addition, the resins mentioned above for use in the charge generating layer 35 can also be used. Needless to say, the high molecular weight charge transporting materials can be preferably used. The content of the charge generating material in the photoconductive layer 33 is preferably from 5 to 40 parts by weight per 100 parts by weight of the binder resin included in the photoconductive layer 33. The content of the charge transporting material in the photoconductive layer 33 is preferably from 0 to 190 parts by weight, and more preferably from 50 to 150 parts by weight, per 100 parts by weight of the binder resin included in the photoconductive layer 33. The photoconductive layer 33 can be formed by coating a coating liquid which is prepared by dispersing a charge generating material and a binder resin, if desired together with a charge transporting material, in a proper solvent such as tetrahydrofuran, dioxane, dichloroethane, cyclohexane and the like using a dispersing device, and drying the coated liquid. Suitable coating methods include dip coating, spray coating, bead coating and the like. The thickness of the photoconductive layer 33 is preferably from 5 to 100 μm.

The photoconductors of the present invention may include an undercoat layer between the electroconductive substrate 31 and the photoconductive layer. The undercoat layer mainly includes a resin. Since a photoconductive layer is typically formed on the undercoat layer by coating a liquid including an organic solvent, the resin in the undercoat layer preferably has good resistance to the organic solvent. Specific examples of such resins include water-soluble resins such as polyvinyl alcohol resins, casein and polyacrylic acid sodium salts; alcohol soluble resins such as nylon copolymers and methoxymethylated nylon resins; and thermosetting resins capable of forming a three-dimensional network such as polyurethane resins, melamine resins, alkyd-melamine resins, epoxy resins and the like.

The undercoat layer may include a fine powder of metal oxides such as titanium oxide, silica, alumina, zirconium oxide, tin oxide and indium oxide to prevent the occurrence of moiré of the resultant recorded images and to decrease residual surface potential of the photoconductor. The undercoat layer can also be formed by coating a coating liquid using a proper solvent and a proper coating method as mentioned above in the photoconductive layer.

A metal oxide layer which is formed, for example, by a sol-gel method using a silane coupling agent, titanium coupling agent or a chromium coupling agent can also be used as an undercoat layer.

A layer of aluminum oxide which is formed by an anodic oxidation method and a layer of an organic compound such as polyparaxylylene or an inorganic compound such as SiO, $SnO_2$, $TiO_2$, ITO or $CeO_2$ which is formed by a vacuum evaporation method are also preferably used as an undercoat layer. The thickness of the under-coat layer is preferably 0 to about 5 μm.

The photoconductors of the present invention may include a protective layer, which is formed overlying the photoconductive layer, to protect the photoconductive layer. Suitable materials for use in the protective layer include ABS resins, ACS resins, olefin-vinyl monomer copolymers, chlorinated polyethers, aryl resins, phenolic resins, polyacetal, polyamides, polyamideimide, polyacrylates, polyarylsulfone, polybutylene, polybutylene terephthalate, polycarbonate, polyethersulfone, polyethylene, polyethylene terephthalate, polyimides, acrylic resins, polymethylpentene, polypropylene, polyphenyleneoxide, polysulfone, polystyrene, AS resins, butadiene-styrene copolymers, polyurethane, polyvinyl chloride, polyvinylidene chloride, epoxy resins and the like. The protective layer may include a fluorine-containing resin or a silicone resin to improve abrasion resistance of the photoconductor. The protective layer may include an inorganic filler such as titanium oxide, tin oxide, potassium titanate and the like, which is dispersed in a resin.

The protective layer can be formed by a conventional coating method. The thickness of the protective layer is from 0.1 to 10 μm. In addition, a layer of amorphous carbon or amorphous silicon carbide which is formed by a vacuum evaporation method can also be used as the protective layer.

In the present invention, an intermediate layer may be formed between the photoconductive layer and the protective layer. The intermediate layer is mainly constituted of a resin. Specific examples of the resin include polyamides, alcohol soluble nylons, polyvinyl butyral having a hydroxide group, polyvinyl butyral, polyvinyl alcohol, and the like. The intermediate layer can be formed by the above-mentioned conventional coating method. The thickness of the intermediate layer is preferably from 0.05 to 2 μm.

Hereinafter the image forming method and image forming apparatus using the photoconductor of the present invention will be explained referring to figures.

Figure 4:
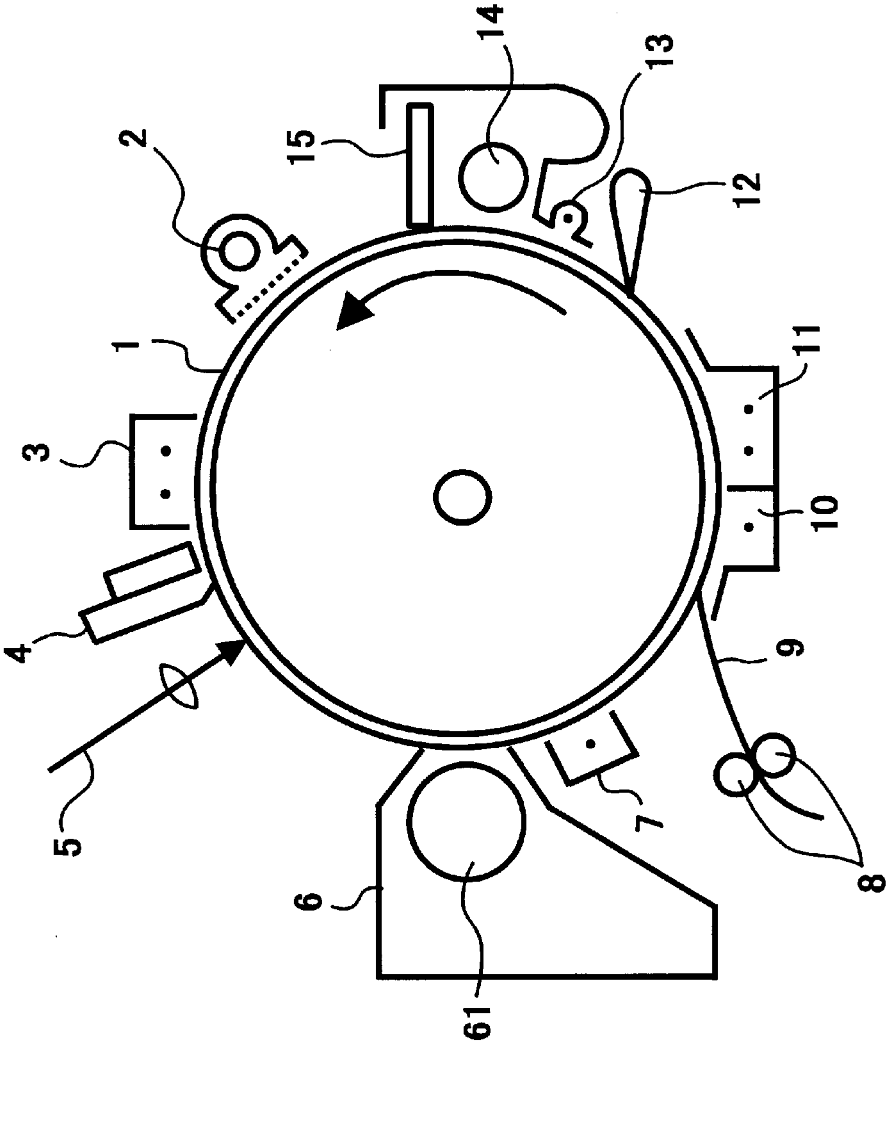
FIG. 4 is a schematic diagram illustrating a main part of an embodiment of the electrophotographic image forming apparatus of the present invention.

FIG. 4 is a schematic view illustrating a main part of an embodiment of the image forming apparatus of the present invention.

In FIG. 4, numeral 1 denotes a cylindrical photoconductor. The photoconductor 1 has a photoconductive layer in which a pigment prepared by the method of the present invention is included. Around the photoconductor 1, a discharging lamp 2, a charger 3, an eraser 4, a light image irradiating device 5, a developing unit 6, a pre-transfer charger 7, a transfer charger 10, a separating charger 11, a separating pick 12, a pre-cleaning charger 13, a fur brush 14, and a cleaning brush 15 are counterclockwise configured in this order. In addition, a pair of registration rollers 8 are provided to feed a transfer paper 9 to the space between the photoconductor 1 and the transfer charger 10 (and the separating charger 11). The photoconductor 1, which is constituted of an electroconductive substrate and a photoconductive layer formed on the substrate, rotates in a direction indicated by an arrow.

The photoconductor 1 is positively or negatively charged with the charger 3 while the photoconductor is rotating. Residual toner is removed from the photoconductor 1 by the eraser 4, and then the light image irradiating device 5 irradiates the photoconductor 1 with imagewise light to form an electrostatic latent image on the photoconductor 1.

A conventional transfer charger can be used as the transfer device of the image forming apparatus of the present invention; however, the above-mentioned transfer device, i.e., a combination of the transfer charger 10 with the separating charger 11, is preferable.

Suitable light sources for use in the light image irradiating device 5 and the discharging lamp 2 include fluorescent lamps, tungsten lamps, halogen lamps, mercury lamps, sodium lamps, light emitting diodes (LEDs), laser diodes (LDs), light sources using electroluminescence (EL), and the like. In addition, in order to obtain light having a desired wave length range, filters such as sharp-cut filters, band pass filters, near-infrared cutting filters, dichroic filters, interference filters, color temperature converting filters and the like can be used. These light sources can also be used for the image transfer process, discharging process, and cleaning process, and a pre-exposure process which is optionally performed, if it is needed to irradiate light to the photoconductor 1 in the processes.

The electrostatic latent image formed on the photoconductor 1 is then developed with a toner on a developing roller 61 in the developing unit 6. The toner image formed on the photoconductor 1 is then charged with the pre-transfer charger 7 so that the toner image has a charge suitable for transferring. The toner image is then transferred onto the transfer paper 9 while the transfer paper 9 is charged with the transfer charger 10. The transfer paper 9 is then charged with the separating charger 11 so as to easily separate from the photoconductor 1 by being released from the state in which the transfer paper 9 and the photoconductor 1 are adhered to each other electrostatically. The transfer paper 9 is then separated from the photoconductor 1 with the separating pick 12. After the toner image transferring process, the surface of the photoconductor 1 is cleaned using the pre-cleaning charger 13, the fur brush 14 and the cleaning brush 15. The residual toner remaining on the photoconductor 1 can be removed by only the cleaning brush 15.

When imagewise light irradiates the photoconductor 1 which is previously charged positively or negatively, an electrostatic latent image having a positive or negative charge is formed on the photoconductor 1. When the latent image having a positive (negative) charge is developed with a toner having a negative (positive) charge, a positive image (i.e., the same image as the latent image) can be obtained. In contrast, when the latent image having a positive (negative) charge is developed with a toner having a positive (negative) charge, a negative image (i.e., a reversal image) can be obtained. As for the developing method, a conventional developing method can be used. In addition, as for the discharging method, a conventional method can also be used.

In this embodiment of the image forming apparatus, a cylindrical photoconductor is used; however, a sheet-shaped or endless-belt-shaped photoconductor can also be used. In addition, corotrons, scorotrons, solid state chargers, and charging rollers can be used as the pre-cleaning charger 13. These chargers can also be used as a substitute for the transfer charger 10 and the separating charger 11; however, the unity of the transfer charger 10 and the separating charger 11 is preferable because of being efficient. Further, known brushes such as fur brushes and magnetic fur brushes can be used as the cleaning brush 15.

Figure 5:
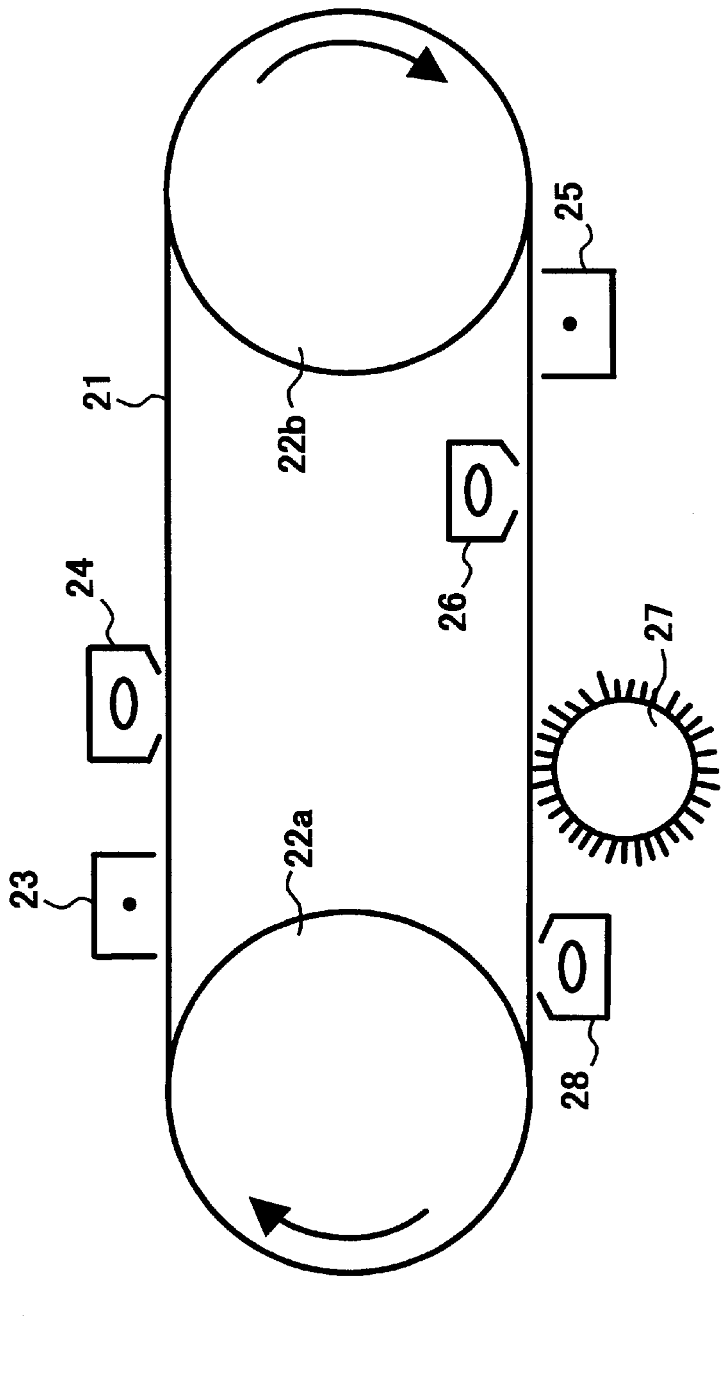
FIG. 5 is a schematic diagram illustrating a main part of another embodiment of the electrophotographic image forming apparatus of the present invention.

FIG. 5 is a schematic view illustrating a main part of another embodiment of the image forming apparatus of the present invention. In this embodiment, a belt-shaped photoconductor 21 is used. The photoconductor 21 has a photoconductive layer including an organic pigment prepared by the method of the present invention. The belt-shaped photoconductor 21 is rotated by rollers 22*a* and 22*b*. The photoconductor 21 is charged with a charger 23, and then light image irradiates the charged photoconductor 21 with a light image irradiating device 24 to form an electrostatic latent image in the photoconductor 21. The latent image is developed with a developing unit (not shown in FIG. 5) to form a toner image on the photoconductor 21. The toner image is transferred onto a transfer paper (not shown) using a transfer charger 25. After the toner image transferring process, the photoconductor 21 is cleaned by performing a pre-cleaning light irradiating operation using a pre-cleaning light irradiating device 26 and a cleaning brush 27, and is then discharged with a discharging light source 28. In the pre-cleaning light irradiating process, light irradiates the photoconductor 21 from the side of the substrate thereof. In this case, the substrate has to be light-transmissive.

The image forming apparatus of the present invention is not limited to the image forming units as shown in FIGS. 4 and 5. For example, in FIG. 5, the pre-cleaning light irradiating can be performed from the photoconductive layer side of the photoconductor 21, and in addition, the light irradiation at the light image irradiating process and the discharging process can be performed from the substrate side of the photoconductor 21. In addition, pre-transfer light irradiation, which is performed before the transferring of the toner image, and preliminary light irradiation of the imagewise light irradiation, which is performed before the imagewise light irradiation, and other light irradiation can also be performed.

Figure 6:
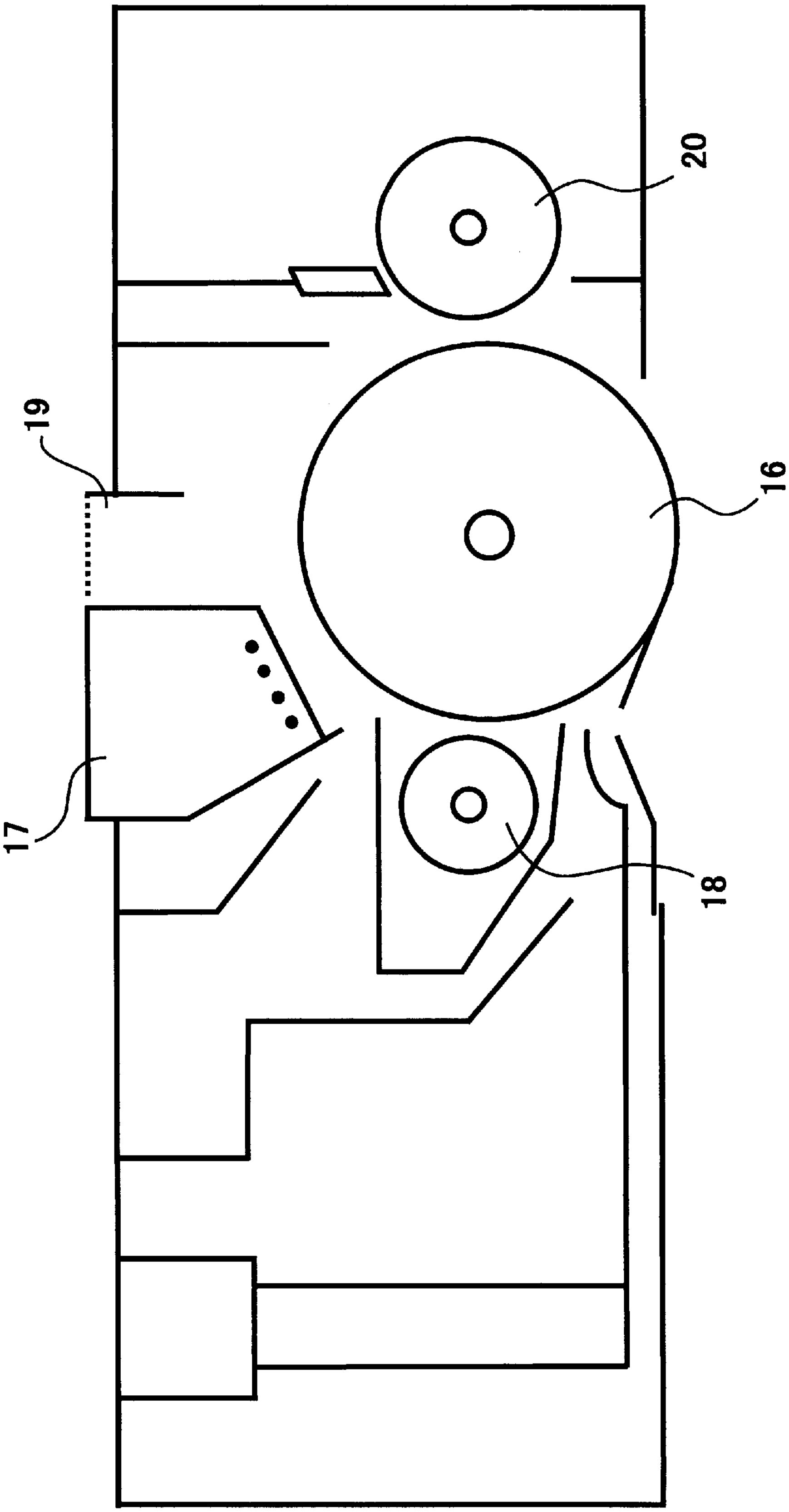
FIG. 6 is a schematic diagram illustrating an embodiment of the electrophotographic image forming process cartridge of the present invention.

The above-mentioned image forming units as shown in FIGS. 4 and 5 can be fixedly incorporated in image forming apparatuses such as copying machines, facsimile machines, printers and the like. Alternatively, the image forming units can be set in the image forming apparatuses as a process cartridge. The term "process cartridge" means a cartridge in which a charger, a light irradiating device, a developing device, a transfer device, a cleaning device, a discharging device and the like are set. Process cartridges having various shapes can be available in the present invention. A typical embodiment of the process cartridges of the present invention is shown in FIG. 6. FIG. 6 illustrates a compact process cartridge in which a charger 17, a cleaning brush 18, a light image irradiating device 19, and a developing roller 20 are provided around a photoconductor 16. The photoconductor 16 has a photoconductive layer which includes an organic pigment prepared by the method of the present invention and which is formed on an electroconductive substrate.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

At first, the method for synthesizing a titanyl phthalocyanine pigment which has a crystal form such that a maximum diffraction peak is observed at a Bragg (2 θ) angle of 27.2°±0.2° (so-called Y type titanyl phthalocyanine) when an X-ray of Cu-K α having a wavelength of 1.514 Å irradiates the crystal will be explained in detail.

Example 1

In a container, 525 parts of phthalodinitrile and 4000 parts of 1-chloronaphthalene were contained and stirred. Under a nitrogen current, 190 parts of tetrachlorotitanium were dropped therein. After the addition of tetrachlorotitanium, the temperature of the mixture was gradually increased to 200° C. The temperature of the mixture was maintained at a temperature range of from 190 to 210° C. for 5 hours to react the compounds. After the reaction was terminated, the reaction product was cooled. When the temperature thereof cooled to 130° C., the reaction product was filtered. Then the filtered cake was washed with 1-chloronaphthalene until the cake colored blue. The cake was then washed with methanol several times, and further washed with hot water at 80° C. several times. When the washed cake was dried, 422 parts of a rough titanylphthalocyanine pigment were obtained. Sixty (60) parts of the thus prepared rough titanylphthalocyanine pigment were added in 1000 parts of 96% sulfuric acid at a temperature of from 3 to 5° C. while stirring, to dissolve the rough titanylphthalocyanine pigment. The solution was filtered, and the filtrate was dropped into 35 liters of iced water while stirring to deposit a crystal (titanylphthalocyanine pigment). The deposited crystal was filtered and then washed with water until the washing water became neutral (pH of 7.0). Thus, an aqueous paste of the titanylphthalocyanine pigment was prepared. One thousand and five hundred parts (1500) of 1,2-dichloroethane were added in the aqueous paste of the titanylphthalocyanine pigment, and the mixture was stirred for 2 hours at room temperature. Then 2500 parts of methanol were added therein, and the mixture was stirred and then filtered. The filtered cake was further washed with methanol. Thus, 98 parts of a wet cake of the pigment was prepared. When 50 parts of the wet cake were dried at 65° C. in the atmosphere (760 mm Hg), 24 parts of a titanylphthalocyanine pigment were prepared. The solid content of the wet cake was 48% by weight.

Example 2

When 48 parts of the wet cake prepared in Example 1 were dried at 65° C. under a reduced atmospheric pressure, a phthalocyanine pigment of 24 parts were prepared. The solid content of the wet cake was 50% by weight.

Example 3

The procedure for preparation of the wet cake of the titanylphthalocyanine pigment in Example 1 was repeated. The solid content of the wet cake was 59% by weight. The wet cake was subjected to vacuum drying at 65° C. under a reduced atmospheric pressure of 5 mm Hg. Thus, a powder of the titanylphthalocyanine pigment was prepared.

Example 4

The procedure for preparation of the wet cake of the titanylphthalocyanine pigment in Example 1 was repeated. The solid content was 68% by weight. The wet cake was subjected to vacuum drying at 65° C. under a reduced atmospheric pressure of 5 mmHg. Thus, a powder of the titanylphthalocyanine pigment was prepared.

Comparative Example 1

Thirty (30) parts of the rough titanylphthalocyanine, which was prepared in Example 1 were treated with sulfuric acid in the same way as performed in Example 1 to prepare an aqueous paste. Seven hundred and fifty (750) parts of 1,2-dichloroethane were added to the aqueous paste, and the mixture was stirred for 2 hours at room temperature. One thousand and two hundred fifty (1250) parts of methanol were added to the mixture, and the mixture was stirred and then filtered. The filtered cake was washed with methanol, and thereby 33.8 parts of a wet cake were prepared. The wet cake was dried at 65° C. under a reduced atmospheric pressure. Thus, a titanyl phthalocyanine pigment of 25 parts was obtained. The solid content of the wet cake was 74% by weight.

Each of the pigments obtained in Examples 1 to 4 and Comparative Example 1 was crushed with a marketed mixer to obtain a powder having a desired particle diameter. The mixing time was shown in Table 1.

TABLE 1

| | Mixing time |
|---|---|
| Powder obtained in Ex. 1 | about 15 seconds |
| Powder obtained in Ex. 2 | about 10 seconds |
| Powder obtained in Ex. 3 | about 20 seconds |
| Powder obtained in Ex. 4 | about 25 seconds |
| Powder obtained in Comp. Ex. 1 | Powder having a uniform particle diameter could not be obtained even when the pigment was crushed for about 60 seconds. However, many large particles remained in the powder. |

X-ray irradiated the titanylphthalocyanine powders prepared in Examples 1 to 4 and Comparative Example 1 to obtain X-ray diffraction spectra. The conditions were as follows:

X-ray tube: copper

Voltage: 40 kV

Current: 20 mA

Scanning speed: 1° /min

Scanning range: 3° to 40°

Time constant: 2 seconds

Figure 7:
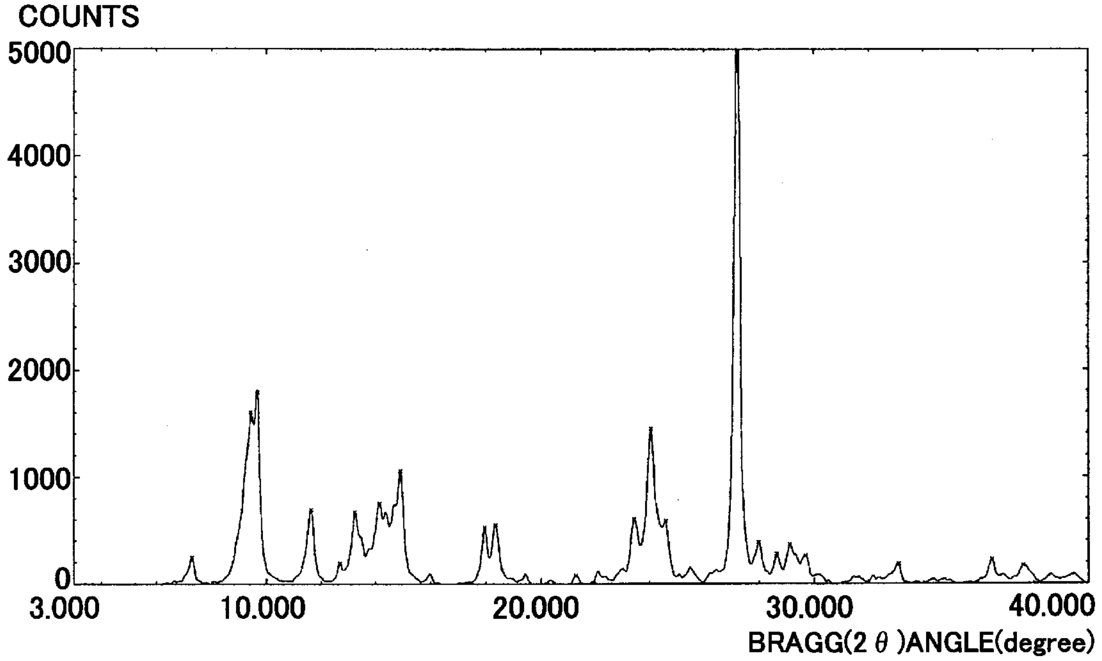
FIG. 7 is a graph illustrating the X-ray diffraction spectrum of an embodiment of the titanyl phthalocyanine pigment prepared by the method of the present invention.

The X-ray diffraction spectra of the powders obtained in Examples 1 to 4 were the same, and therefore the spectrum of the powder obtained in Example 2 is shown in FIG. 7 as a typical example. As can be understood from FIG. 7, the thus prepared titanylphthalocyanine pigment has a target crystal form such that a maximum peak of the X-ray diffraction spectrum is observed at a Bragg (2 θ) angle of 27.2°±0.2°. Therefore the pigment has a desired crystal form (Y type).

Figure 8:
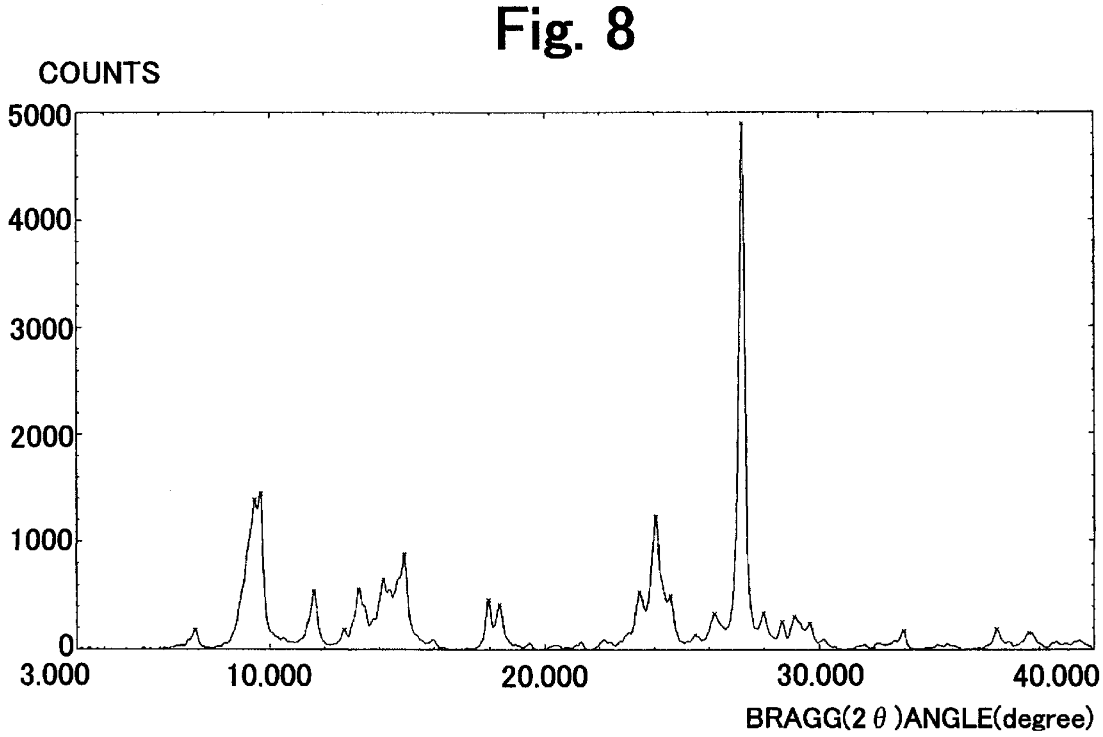
FIG. 8 is a graph illustrating the X-ray diffraction spectrum of an embodiment of the titanyl phthalocyanine pigment prepared by a comparative method.

The spectrum of the powder obtained in Comparative Example 1 is shown in FIG. 8. The spectrum has a crystal form such that a maximum peak of the X-ray diffraction spectrum is observed at an angle of 26.3°±0.2° other than the Bragg (2θ) angle of 27.2°±0.2°. Therefore the pigment has another crystal form (A type or β type). It is considered that the crystal change occurred during the crushing process because the processes of the synthesis process, sulfuric acid treatment process and crystal form changing process were performed in the same way. The reason of this crystal change is considered to be that the resultant pigment powder prepared in Comparative Example 1 had a high bulk density (i.e., the powder was firmly set), and therefore it takes a long time to crush the pigment powder, resulting in application of large stresses to the pigment during the crushing process.

Next, the method for manufacturing a photoconductor will be explained.

Example 5

The following components were contained in a ball mill pot, which had a diameter of 90 mm and contained 600 g of PSZ balls having a particle diameter of 5 mm therein, and then dispersed for 2 hours at a rotation speed of 60 rpm to prepare a Dispersion 1.

| | |
|---|---|
| Titanylphthalocyanine pigment powder prepared in Example 1 | 1.5 |
| Polyvinyl butyral solution of methyl ethyl ketone (polyvinyl butyral/methyl ethyl ketone = 1/80) | 81 |

Example 6

The procedure for preparation of Dispersion 1 in Example 5 was repeated to prepare a Dispersion 2 except that the titanylphthalocyanine pigment powder prepared in Example 1 was replaced with 1.5 parts of the titanylphthalocyanine pigment powder prepared in Example 2.

Example 7

The procedure for preparation of Dispersion 1 in Example 5 was repeated to prepare a Dispersion 3 except that the titanylphthalocyanine pigment powder prepared in Example 1 was replaced with 1.5 parts of the titanylphthalocyanine pigment powder prepared in Example 3.

Example 8

The procedure for preparation of Dispersion 1 in Example 5 was repeated to prepare a Dispersion 4 except that the titanylphthalocyanine pigment powder prepared in Example 1 was replaced with 1.5 parts of the titanylphthalocyanine pigment powder prepared in Example 4.

Comparative Example 2

The procedure for preparation of Dispersion 1 in Example 5 was repeated to prepare a Dispersion 5 except that the titanylphthalocyanine pigment powder prepared in Example 1 was replaced with 1.5 parts of the titanylphthalocyanine pigment powder prepared in Comparative Example 1.

Comparative Example 3

The procedure for preparation of Dispersion 1 in Example 5 was repeated to prepare a Dispersion 6 except that the titanylphthalocyanine pigment powder prepared in Example 1 was replaced with 1.5 parts of the titanylphthalocyanine pigment powder prepared in Comparative Example 1 and the milling time was changed to 10 hours.

The particle size of the pigment particles in Dispersions 1 to 6 was measured with CAPA700 manufactured by HORIBA, LTD. In addition, Dispersions 1 to 6 were dried and X-ray irradiated the resultant powders under the same conditions mentioned above to obtain X-ray diffraction spectra of the powders.

The results are shown in Table 2.

TABLE 2

| | Average particle diameter (μm) | X-ray diffraction spectrum |
|---|---|---|
| Ex. 5 (Dispersion 1) | 0.37 | Same as that in FIG. 7 |
| Ex. 6 (Dispersion 2) | 0.31 | Same as that in FIG. 7 |
| Ex. 7 (Dispersion 3) | 0.36 | Same as that in FIG. 7 |
| Ex. 8 (Dispersion 4) | 0.39 | Same as that in FIG. 7 |
| Comp. Ex. 2 (Dispersion 5) | 0.78 | Same as that in FIG. 8 |
| Comp. Ex. 3 (Dispersion 6) | 0.46 | The peak at the angle of 26.3° became higher |

As can be understood from Table 2, the dispersion including a pigment prepared by the method of the present invention includes finely dispersed titanylphthalocyanine pigment particles, and the dispersed titanylphthalocyanine pigment maintains the desired crystal form.

Example 9

On one side of an electrocasted nickel belt, the following undercoat layer coating liquid, charge generating layer coating liquid and charge transporting layer coating liquid were coated and dried one by one. Thus, a multi-layer type photoconductor was prepared.

| Formulation of undercoat layer coating liquid | |
|---|---|
| Titanium dioxide powder | 15 |
| Polyvinyl butyral | 6 |
| 2 -Butanone | 150 |
| **Formulation of charge generating layer coating liquid** | |
| Dispersion 1 | 100 |
| **Formulation of charge transporting layer coating liquid** | |
| Polycarbonate | 10 |
| Methylene chloride | 80 |
| Charge transporting material having the following formula | 7 |

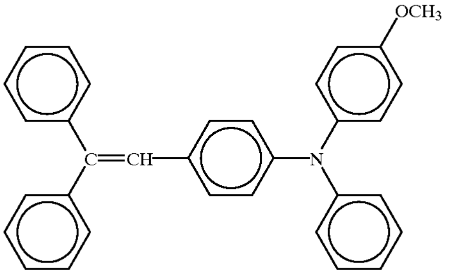

Thus, a multi-layer type photoconductor of the present invention was prepared.

Example 10

The procedure for preparation of the photoconductor in Example 9 was repeated except that Dispersion 1 in the charge generating layer coating liquid was replaced with Dispersion 2.

Comparative Example 4

The procedure for preparation of the photoconductor in Example 9 was repeated except that Dispersion 1 in the charge generating layer coating liquid was replaced with Dispersion 6.

Each of the photoconductors prepared in Examples 9 and 10 and Comparative Example 4 was set in an image forming apparatus having the image forming unit as shown in FIG. 5, and 5000 images were continuously reproduced using a laser diode, which emitted light having a wavelength of 780 nm, as the light source of the light image irradiating device. Light image irradiated the photoconductor via a polygon mirror. In addition, the pre-cleaning light irradiation was not performed. Further, a probe of a surface potential meter was set in the apparatus to measure the initial surface potentials of two areas of each photoconductor, one of which was exposed to light and the other of which was not exposed to light. Further, the surface potentials of the two areas were also measured at $5000^{th}$ image forming operation.

'The results are shown in Table 3.

TABLE 3

| | Initial surface potential (V) | | Surface potential at the 5000$^{th}$ image forming operation (V) | |
|---|---|---|---|---|
| | Area which was not exposed to light | Area which was exposed to light | Area which was not exposed to light | Area which was exposed to light |
| Ex. 9 | −851 | −120 | −832 | −117 |
| Ex. 10 | −853 | −110 | −847 | −105 |
| Comp. Ex. 4 | −903 | −230 | −888 | −263 |

As can be understood from Table 3, the photoconductor of the present invention has good charge properties and can maintain the charge properties even when repeatedly used for a long time.

Example 11

The surface of an aluminum cylinder was subjected to an anodic oxidation treatment and then was sealed. The following charge generating layer coating liquid and charge transporting layer coating liquid were then coated and dried one by one, to form a charge generating layer of 0.2 μm thick and a charge transporting layer of 20 μm thick thereon. Thus, a photoconductor of the present invention was prepared.

| Formulation of charge generating layer coating liquid | |
|---|---|
| Dispersion 1 | 100 |
| **Formulation of charge transporting layer coating liquid** | |
| Polycarbonate | 10 |
| Methylene chloride | 80 |
| Charge transporting material having the following formula | 8 |

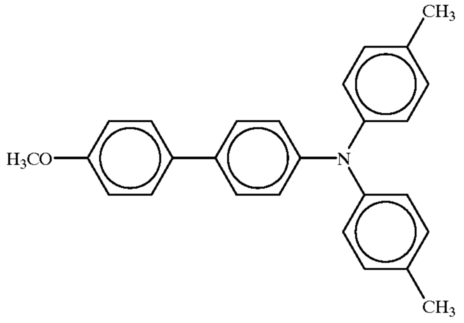

Thus, a multi-layer type photoconductor of the present invention was prepared.

Example 12

The procedure for preparation of the photoconductor in Example 11 was repeated except that the charge generating layer coating liquid was replaced with 100 parts of Dispersion 3. Thus a photoconductor of the present invention was prepared.

Example 13

The procedure for preparation of the photoconductor in Example 11 was repeated except that the charge generating layer coating liquid was replaced with 100 parts of Dispersion 4. Thus a photoconductor of the present invention was prepared.

Comparative Example 5

The procedure for preparation of the photoconductor in Example 11 was repeated except that the charge generating layer coating liquid was replaced with 100 parts of Dispersion 5. Thus a comparative photoconductor was prepared.

Each of the photoconductors prepared in Examples 11 to 13 and Comparative Example 5 was set in an electrophotographic process cartridge as shown in FIG. 6, and the cartridge was set in an image forming apparatus. Three thousand (3000) images were continuously reproduced using a laser diode, which emitted light having a wavelength of 780 nm, as the light source of the light image irradiating device. Light image irradiated the photoconductor via a polygon mirror. The image qualities of the initial image and the 3000th image were visually observed. The results are shown in Table 4.

TABLE 4

| | Initial image qualities | Image qualities of 3000$^{th}$ image |
|---|---|---|
| Ex. 11 | good | good |
| Ex. 12 | good | good |
| Ex. 13 | good | good |
| Comp. Ex. 5 | Image defects occurred which were caused by coating defects | Image defects occurred which were caused by coating defects, and image density decreased |

As can be understood from Table 4, the photoconductor of the present invention can maintain good image qualities even when used for a long time.

Example 14

The procedure for preparation of the photoconductor in Example 9 was repeated except that the electrocasted nickel belt substrate was replaced with an aluminum cylinder substrate.

Thus a photoconductor of the present invention was prepared.

Example 15

The procedure for preparation of the photoconductor in Example 14 was repeated except that the formulation of the charge transporting layer coating liquid was changed to the following formulation.

| Formulation of charge transporting layer coating liquid | |
|---|---|
| Methylene chloride | 100 |
| High molecular weight charge transporting material having the following formula | 10 |

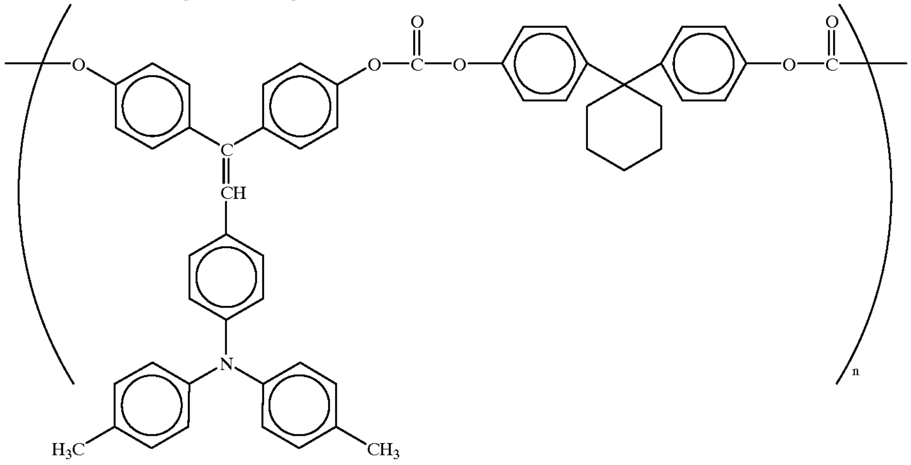

Example 16

The procedure for preparation of the photoconductor in Example 14 was repeated except that the formulation of the charge transporting layer coating liquid was changed to the following formulation.

| Formulation of charge transporting layer coating liquid | |
|---|---|
| Methylene chloride | 100 |
| High molecular weight charge transporting material having the following formula | 10 |

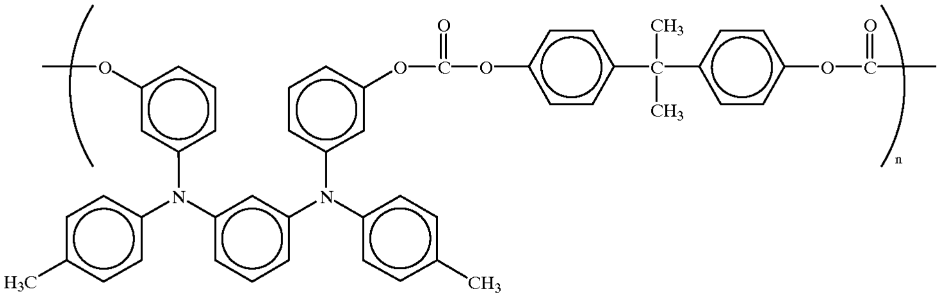

Each of the photoconductors prepared in Examples 14 to 16 was set in an electrophotographic image forming apparatus as shown in FIG. 4. Ten thousand (10000) images were continuously reproduced using a laser diode, which emitted light having a wavelength of 780 nm, as the light source of the light image irradiating device. Light image irradiated the photoconductor via a polygon mirror. The image qualities of the initial image and the 10000th image were visually observed. In addition, the thickness of the photoconductive layer of each photoconductor was measured before and after the running test to determine a decrease of the thickness. The results are shown in Table 5.

TABLE 5

| | Initial image qualities | Image qualities of 10000$^{th}$ image | Decrease of photoconductive layer ($\mu$m) |
|---|---|---|---|
| Ex. 14 | good | Slight black stream occurred, but it is on an acceptable level | 2.8 |

TABLE 5-continued

| | Initial image qualities | Image qualities of $10000^{th}$ image | Decrease of photoconductive layer ($\mu$m) |
|---|---|---|---|
| Ex. 15 | good | good | 1.0 |
| Ex. 16 | good | good | 1.1 |

As mentioned above, according to the present invention, a method is provided for effectively preparing an organic pigment useful for an electrophotographic photoconductor. By using this method, a coating liquid in which an organic pigment having a fine particle diameter is dispersed without changing its crystal form can be prepared. The coating liquid is useful for forming photoconductive layer, and the resultant photoconductive layer has good charge properties and few coating defects. Therefore, a photoconductor having high sensitivity, stable charge properties and good abrasion resistance can be provided. In addition, an image forming apparatus and process cartridge which includes the photoconductor of the present invention and which can produce images having good image qualities even when repeatedly used for a long time can also be provided.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 10-225177, filed on Jul. 27, 1998, the entire contents of which are herein incorporated by reference.

What is claimed is:

1. A method of manufacturing an organic pigment comprising the steps of:

providing an organic pigment wet cake which includes at least an organic pigment and a solvent, and drying the organic pigment wet cake by heating the wet cake at a temperature higher than room temperature to prepare a powder of the organic pigment, wherein the organic pigment is present in the organic pigment wet cake in an amount of not greater than about 70% by weight at the beginning of the drying step.

2. The method according to claim 1, wherein the organic pigment is present in the organic pigment wet cake in an amount of not greater than about 50% by weight at the beginning of the drying step.

3. The method according to claim 1, wherein the wet cake providing step includes:

controlling a crystal form of the organic pigment.

4. The method according to claim 3, wherein the organic pigment is capable of existing in a plurality of crystal forms, including one crystal form characterized by a superior photoelectric converting property, and wherein the controlling step comprises preparing the organic pigment in said one crystal form for inclusion in the wet cake.

5. The method according to claim 1, wherein the drying step is performed under a reduced atmospheric pressure not greater than about 10 mm Hg.

6. The method according to claim 1, wherein the organic pigment comprises a phthalocyanine compound.

7. The method according to claim 1, wherein the organic pigment comprises a titanyl phthalocyanine compound.

8. The method according to claim 7, wherein the titanyl phthalocyanine compound has an X-ray diffraction spectrum such that a maximum peak is observed at a Bragg (2θ) angle of 27.2°±0.2° when an X-ray of Cu-K α having a wavelength of 1.514 Å irradiates the titanyl phthalocyanine compound.

* * * * *